Figure 1:
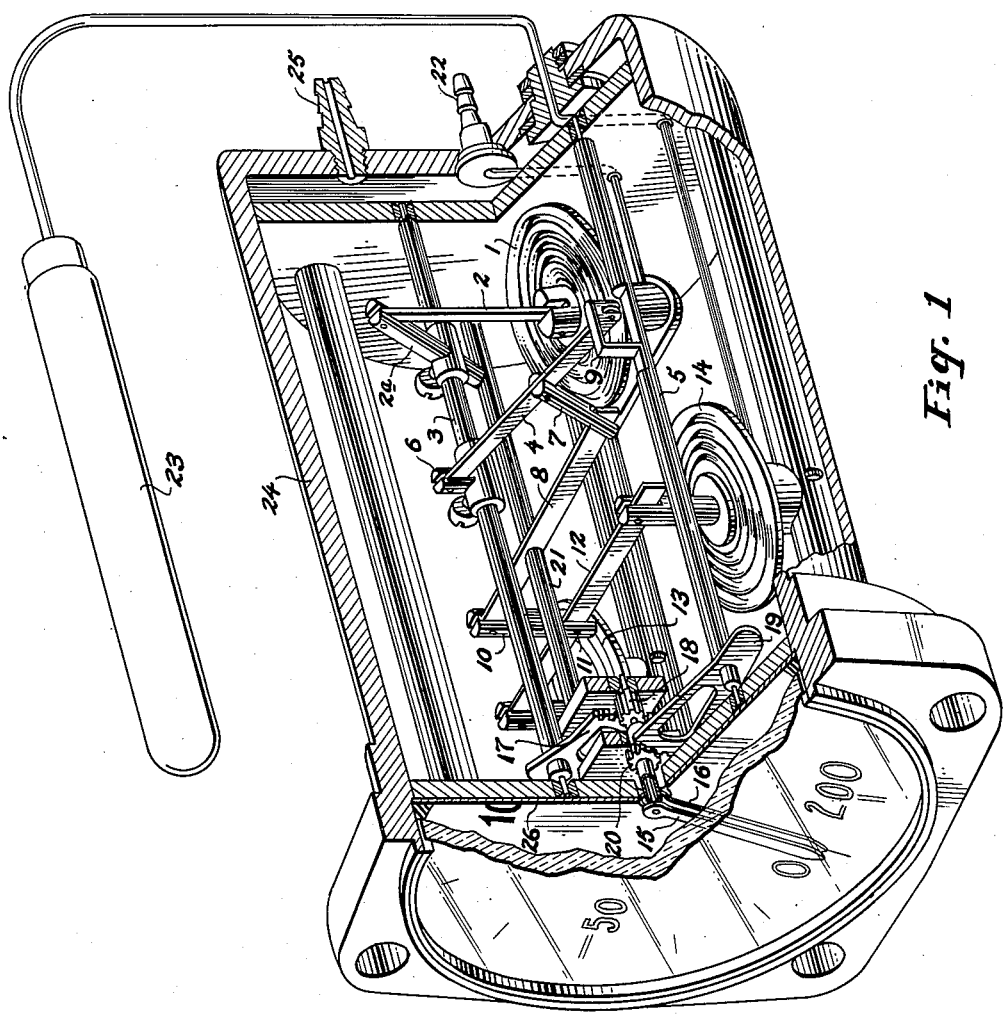

March 8, 1960  J. DÁRBUJÁN  2,927,460
SPEED INDICATOR FOR AIRPLANES

Filed July 5, 1956  2 Sheets-Sheet 1

INVENTOR
JIRI DARBUJAN
BY
AGENT

March 8, 1960   J. DARBUJÁN   2,927,460
SPEED INDICATOR FOR AIRPLANES
Filed July 5, 1956   2 Sheets-Sheet 2

INVENTOR
JIRI DARBUJAN
BY
AGENT

United States Patent Office 2,927,460
Patented Mar. 8, 1960

2,927,460

SPEED INDICATOR FOR AIRPLANES

Jiří Dařbuján, Prague, Czechoslovakia, assignor to Výzkumný a zkušební letecký ústav, Letnany near Prague, Czechoslovakia Application July 5, 1956, Serial No. 595,938

5 Claims. (Cl. 73—182)

The present speed indicators for airplanes usually measure the pressure difference which is transmitted to the indicator from a Pitot-tube and which constitutes the difference between the total pressure and the static pressure. This pressure difference is directly proportional to the square of the speed, linearly proportional to the static pressure and inversely proportional to the absolute temperature of the air. The simplest speed indicators are provided only with a pressure measuring device, usually in the form of a diaphragm which is actuated by the difference between the total pressure and the static pressure, and the deviations thereof are transmitted over a suitable transmitting mechanism to a pointer which is movable along a scale, calibrated directly in speed units, for example, kilometers or miles per hour. The calibration is generally accomplished for the standard zero altitude, so that this speed indicator indicates the true speed correctly only under these circumstances.

Under different conditions, for example, at higher altitudes, it shows the so called indicated speed, which may differ from the true relative speed by 100 percent or more. Knowledge of the indicated speed is essential for the control of the stalling speed, that is, the lowest permissible speed of the airplane. However, for navigation purposes, it is necessary to evaluate the true relative speed from the indicated speed in relation to the surrounding atmosphere.

There also exist speed indicators with imperfect correction for the air density. These indicators differ from the first described speed indicators in that the transmitting mechanism from the diaphragm or other pressure responsive organ measuring the speed is influenced by some other pressure measuring device, for example, an evacuated vessel, which is sensitive to changes in the absolute pressure, so that the speed indicator shows the true relative speed of the airplane under the so called standard conditions, that is, so long as the temperature of the medium coincides with the international standards of the atmosphere at the given barometric pressure. However, since the actual temperature of the air often differs considerably from these standard conditions, errors of the speed indicator may reach 6 percent and more.

The true speed of the airplane relative to the surrounding air can be shown only by a speed indicator with perfect correction as to air density, and thus having a transmitting mechanism which is influenced by an evacuated vessel sensitive to changes in the absolute value of the static pressure and simultaneously by a remote control thermometer device which measures the temperature of the surrounding air. The known speed indicators of this kind employ a rather complicated transmitting mechanism and require large operating forces exerted by the pressure responsive device measuring the speed.

It is an object of the present invention to provide a speed indicator for airplanes, which effects the required perfect correction for air density, but which is still mechanically simple, and wherein the force required for actuating the indicating device is comparatively small, so that the speed indicator embodying the invention can be efficiently used even for low speeds, as are experienced with training airplanes or with gliders.

Figure 2:
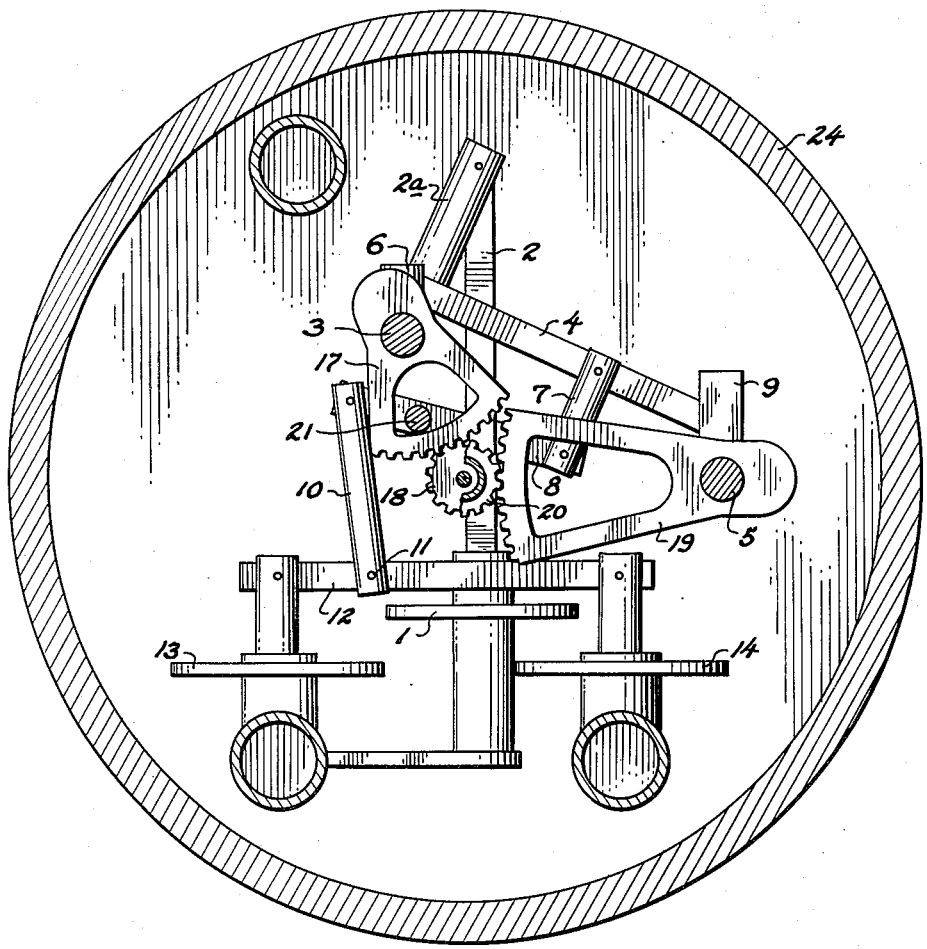

The above, and other objects, features and advantages of the invention will be apparent in the following detailed description of an illustrative embodiment which is to be read in connection with the accompanying drawing, wherein:

Fig. 1 is a perspective view of a speed indicator constructed in accordance with the invention and which is shown partly broken away and in section; and Fig. 2 is a transverse sectional view of the speed indicator looking rearwardly at a plane immediately in back of the indicator card.

The total pressure measured by a Pitot-tube (not shown) is transmitted by a conduit 22 to a diaphragm or pressure measuring vessel 1 situated in a standard air-tight case 24, and, as is generally the case in speed indicators, the static pressure measured by the Pitot-tube is transmitted to the interior of case 24 by a conduit 25. Thus, the diaphragm or pressure measuring vessel 1 is subjected to the difference between the total and static pressures, which difference is referred to as the dynamic pressure. A bar 2 is pivotally connected between a movable wall of diaphragm 1 and a radial arm 2a extending from a shaft 3. The shaft 3 has a segment gear 17 thereon meshing with a pinion 18 which drives a pointer 15 to show the indicated speed. The shaft 3 is linked, by means of a bar or link 4, with a parallel shaft 5. Shaft 5 carries a segment gear 19 which meshes with a pinion 20 driving a pointer 16 for indicating the actual speed. The bar 4 is hingedly connected, at one end, to a crank arm 6 extending radially from shaft 3 and, at its other end, to a flat spring 9 which is firmly fixed upon the shaft 5. Further, intermediate its opposite ends, the bar 4 is hingedly connected to one end of a bar or link 7. The other end of bar 7 is hingedly connected to one end of a double-armed lever 8 which is mounted on a shaft 21 extending parallel to shafts 3 and 5. The other end of lever 8 is hingedly connected to a bar 10 extending from a compensation joint 11. This compensation joint 11 is situated upon a cross beam 12 which is hinged, at one end, on an evacuated static pressure responsive vessel 13, and at the other end, on the diaphragm 14 of a liquid type thermometer 23. The vessel 13 and the diaphragm 14 are suitably secured within case 24. The arrangement described above, together with a dial 26 cooperating with pointers 15 and 16, is situated in the air-tight case 24 of standard size, into which the static pressure from the Pitot-tube is transmitted by the conduit 25.

The movements of speed measuring diaphragm or vessel 1, which is actuated by the dynamic pressure, that is, the difference between the total and the static pressures, are transmitted to the shaft 3, and there, by way of the meshing gear 17 and pinion 18, to the pointer 15 which cooperates with the dial 26 to show the indicated speed. At the same time, the bar 4 is shifted by the arm 6. The apparatus is set so that, at a specific density of the air, corresponding to the standard altitude of 0 km., the hinged connection between the bar 7 and the lever 8 lies in a plane defined by the axes of parallel shafts 3 and 5. In this case the length of the arm 6 is equal to the length of the bar 7 and, also equal to the distance from the axis of shaft 5 to the point at which the bar 4 acts upon the flat spring 9 attached to the shaft 5. The angular deflection of the shaft 5 is, in this case, equal to that of the shaft 3 so that the pointer 16 is angularly displaced, by way of gear 19 and pinion 20, an amount equal to that of pointer 15 and cooperates with dial 26 to show a true relative speed equal to the indicated speed. As the atmospheric conditions change, that is, as the temperature or the static pressure of the medium deviate from the standard values for an altitude of 0 km., that is, at sea level, the evacuated vessel 13 and diaphragm 14 produce movements which alter the position of the compensation joint 11 and of the cross beam 12, and thereby cause a turning of the shaft 21. The lever 8 follows the turning of shaft 21 and thereby shifts the fulcrum point of bar 7, that is, the hinged connection between bar 7 and lever 8, causing a bending of the flat spring 9, so that the distance from the axis of shaft 5 of the point at which bar 4 acts upon the flat spring 9 is changed, thereby changing the transmission ratio between the shafts 3 and 5. To provide correct functioning of the described apparatus, the vessel 13 and the diaphragm 14 are designed so that the deviation of the evacuated vessel 13 is proportional to the logarithm of the barometric (static) pressure, while the deviation of the diaphragm 14 is proportional to the logarithm of the absolute temperature of the medium. The desired characteristics of the corrugated diaphragms 13 and 14 can be achieved by suitably selecting the geometrical shape, dimensions and corrugations thereof in the manner described in "Investigations of the Properties of Corrugated Diaphragms," by W. A. Wildhack, R. F. Dresser and E. C. Lloyd, Transactions ASME, 79, (1957), No. 1. With the vessel 13 and diaphragm 14 being thus designed, the deviation of the compensating joint 11 is proportional to the logarithm of the specific density of the surrounding air for any combination of pressure and temperature. The existence of this relationship may be proved by obtaining the logarithms of the equation of state of gases $p=aRT$, where $p$ is the pressure, $a$ the specific density, $T$ the absolute temperature and $R$ the constant of the air, and by comparing the kinematic arrangement of the apparatus, that is, of the evacuated vessel 13 and diaphragm 14, the cross beam 12 and the compensation joint 11. The transmission ratio between the movement of the compensation joint 11 and the deflection of the shaft 21 is chosen so that the pointer 16 indicates the true relative speed of the airplane.

The described arrangement provides, as compared with other known apparatuses of this kind, a considerably increased accuracy, particularly when used as a speed indicator for navigation purposes. The transmission mechanism from the speed measuring vessel 1 to the pointer 16 is furthermore rather simple and practically free from any forces due to the compensation elements 13 and 14, so that it is possible to use this instrument for high speeds, and also for slow speeds, for example, in slow training planes, gliders and the like, where only small pressure differences are available and the forces exerted by the measuring vessels or diaphragms are small. A further advantage is that the instrument may be designed as a two pointer instrument, for simultaneously showing the actual and the indicated speeds, as in the illustrated embodiment.

Although a particular embodiment of the invention has been described in detail herein with reference to the accompanying drawing, it is to be understood that the invention is not limited to that particular embodiment, and that various changes and modifications may be effected therein by one skilled in the art without departing from the scope or spirit of the invention, except as defined in the appended claims.

I claim:

1. An air speed indicator comprising a diaphragm subjected to the difference between static pressure and total pressure so that movements of said diaphragm correspond to changes in indicated air speed, first and second correction elements sensitive to changes in the static pressure and in the temperature, respectively, of the air, indicator means including a movable pointer and a scale for indicating true relative air speed, variable transmission means between said diaphragm and pointer to displace the latter in response to movement of said diaphragm, a connecting link between said first and second correction elements and having a point along its length which moves as a function of changes in the specific density of the air in response to the static pressure and temperature responsive movements of said first and second correction elements, and means responsive to movements of said point on the connecting link to vary the transmission ratio of said transmission means so that the displacements of said pointer correspond to changes in the true relative air speed.

2. An air speed indicator comprising a first diaphragm subjected to the difference between static pressure and total pressure to provide movements which correspond to indicated air speed, a second diaphragm subjected to static pressure and movable in a given direction in response to changes in static pressure, a third diaphragm spaced from said second diaphragm and subjected to the temperature of the air to move parallel to said given direction in response to changes in the temperature of the air, a connecting link attached, at its opposite ends, to said second and third diaphragms and having a point along its length which moves parallel to said given direction as a function of changes in the specific density of the air in response to the static pressure and temperature responsive movements of said second and third diaphragms, parallel first and second shafts, means connecting said first diaphgram to said first shaft to effect turning of the latter, variable transmission means between said first and second shafts to turn the latter in response to turning of said first shaft, a pointer, means for displacing said pointer in response to turning of said second shaft, a scale, and control means connected to said point of the connecting link and to said transmission means to vary the transmission ratio of the latter in response to movements of said point of the connecting link so that said pointer indicates true relative speed on said scale.

3. An air speed indicator as in claim 2; wherein said transmission means includes a crank arm of fixed length on one of said shafts, a crank arm of variable length on the other of said shafts, and a connecting rod pivotally connected, at its opposite ends, to the crank arms on said first and second shafts; and wherein said control means includes a bar pivotally connected, at one end, to said connecting rod intermediate the ends of the latter, said bar having a length equal to the fixed length of the crank arm on said one shaft, and a movable support pivotally connected to the other end of said bar and actuated from said point of the connecting link so that, when actual atmospheric conditions are identical with standard conditions at sea level, the pivoting axis at said other end of the bar lies in the plane passing through the axis of said parallel shafts and said variable length crank arm is equal to the fixed length crank arm.

4. An air spaced indicator as in claim 3; further comprising a second pointer, means effective to displace said second pointer in accordance with turning of said first shaft so that said second pointer cooperates with said scale to show indicated air speed simultaneously with the showing of true relative air speed by the first mentioned pointer.

5. An air speed indicator comprising a diaphragm subjected to the difference between static pressure and total pressure so that movements of said diaphragm correspond to changes in indicated air speed, first and second correction elements sensitive to changes in the static pressure and in the temperature, respectively, of the air, indicator means including a movable pointer and a scale for indicating true relative air speed, first and second parallel shafts, means connecting said diaphragm to said first shaft to turn the latter in accordance with changes in indicated air speed, crank arms on said first and second shafts, a connecting rod pivotally connected between said crank arms, means for displacing said pointer in accordance with turning of said second shaft, a connecting link between said first and second correction elements and having a point along its length which moves as a function of changes in the specific density of the air in response to the static pressure and temperature responsive movements of said first and second correction elements, and means operative to vary the ratio of the effective lengths of said crank arms in response to movement of said point on the connecting link, thereby to vary the transmission ratio between said first and second shafts so that the displacements of said pointer correspond to changes in the true relative air speed.

References Cited in the file of this patent

UNITED STATES PATENTS

| | | |
|---|---|---|
| 2,251,498 | Schwien | Aug. 5, 1941 |
| 2,318,153 | Gilson | May 4, 1943 |
| 2,522,337 | Angst | Sept. 12, 1950 |
| 2,563,207 | Bevins | Aug. 7, 1951 |
| 2,638,782 | Leach | May 19, 1953 |

FOREIGN PATENTS

| | | |
|---|---|---|
| 374,730 | Germany | Apr. 27, 1923 |